(12) United States Patent
Young et al.

(10) Patent No.: US 6,303,915 B1
(45) Date of Patent: Oct. 16, 2001

(54) METHOD AND APPARATUS FOR SEPARATING AND COOKING EGGS

(76) Inventors: Todd L. Young, 8006 Isaac Pryor Dr., Austin, TX (US) 78749; Eric Schake, 2512 Maple Ave., #2A, Dallas, TX (US) 75201

( * ) Notice: Subject to any disclaimer, the term of this patent is extended or adjusted under 35 U.S.C. 154(b) by 0 days.

(21) Appl. No.: 09/394,015

(22) Filed: Sep. 10, 1999

(51) Int. Cl.⁷ .............................. A47J 43/14; A23J 1/09; A23L 1/32
(52) U.S. Cl. ........................... 219/735; 219/733; 99/499; 426/478; 220/573.1
(58) Field of Search .................... 219/735, 734, 219/733, 725; 220/573.1, 912; 99/340, 499, 497, 500; D7/667; 210/513–514, 469; 426/298, 478

(56) References Cited

U.S. PATENT DOCUMENTS

| D. 185,399 | * | 6/1959 | Tupper | D7/667 |
|---|---|---|---|---|
| 657,125 | * | 9/1900 | Lindsay | 99/499 |
| 1,054,606 | * | 2/1913 | Payne | 99/499 |
| 1,327,929 | * | 1/1920 | Tripke | 99/499 |
| 2,187,488 | * | 1/1940 | Brueggeman | 99/499 |
| 3,857,327 | * | 12/1974 | Popeil | 99/499 |
| 4,133,996 | * | 1/1979 | Fread | 219/735 |
| 5,088,392 | * | 2/1992 | Ancona et al. | 99/499 |
| 5,387,781 | * | 2/1995 | Berkoff | 219/735 |
| 5,558,798 | * | 9/1996 | Tsai | 219/734 |
| 5,957,038 | * | 9/1999 | Shimazaki | D7/667 |
| 6,095,038 | * | 8/2000 | Cerro | 99/499 |

FOREIGN PATENT DOCUMENTS

| 586375 | * | 10/1934 | (DE) | 99/499 |
|---|---|---|---|---|
| 3012353 | * | 10/1981 | (DE) | 219/725 |
| 2552991 | * | 4/1985 | (FR) | 99/497 |
| 8-336372 | * | 12/1996 | (JP) | . |

* cited by examiner

*Primary Examiner*—John A. Jeffery
(74) *Attorney, Agent, or Firm*—Haynes and Boone, LLP

(57) ABSTRACT

Method and apparatus are described for separating and cooking egg whites. A heat resistant bowl includes a bottom portion and a wall portion, a lid for removably engaging the wall portion of the bowl in a snug fit, and a separator for separating liquid egg whites from eggs, the separator being connected to the lid, whereupon the egg whites are cooked in the bowl by subjecting the bowl to microwaves.

9 Claims, 4 Drawing Sheets

METHOD AND APPARATUS FOR SEPARATING AND COOKING EGGS

BACKGROUND

This disclosure relates generally to containers and cookware, and more particularly to an apparatus and a method for separating and cooking eggs.

For many years weight lifters and others interested in a high protein, low fat, diet have sought readily digestible protein. Such protein should be as pure as possible, without associated fats or carbohydrates. Historically, egg whites have filled this niche. Eating uncooked egg whites is undesirable because of risks of bacterial infection, including exposure to salmonella.

However, preparing cooked egg whites has always been inconvenient. For example, in one method, eggs may be boiled whole and then the shells peeled off, and the yolks removed. Often, this is a time consuming and laborious process. In another method, egg whites may be separated from the yolks before cooking and then fried, however, this is undesirable for two reasons. First, frying requires a certain amount of oil or butter, which contains a disproportionate amount of fat. Second, this method requires multiple utensils, which increases the cleanup time.

Therefore, what is needed is an improved method and apparatus for separating and cooking egg whites that easily separates the whites from the yolk, cooks without using fat, and is simple to clean.

SUMMARY

The present invention, accordingly, provides a method and apparatus for separating and cooking eggs comprising a heat resistant bowl having a bottom portion and a wall portion, a lid for removably engaging the wall portion of the bowl in a snug fit, and an arrangement for separating liquid egg whites from eggs, the arrangement being connected to the lid, whereupon the egg whites may then be cooked in the bowl. In one aspect, a radially extending lip is disposed on the wall portion of the bowl to provide a gripping surface while opening and closing the lid, and one or more vents are provided in the lid. The separator includes an extrusion projecting from the lid for retaining the yolk of the egg, and at least one slot for allowing the egg white to pass through the slot and into the bowl.

In another embodiment, a larger separator cooker has a lid which contains two separators and the bowl is divided into two portions.

In yet another embodiment, a smaller separator cooker is provided for cooking a relatively small amount of egg whites.

One advantage of the embodiments described herein is that a separator is connected to the lid to separate the egg whites before they are cooked, making separation easier. Another advantage of the embodiments described herein is that the cooker is a two-piece unit, comprising the lid and the bowl, which is convenient for consumer cleanup and is easier to manufacture. Another advantage is that the invention facilitates cooking of egg whites without fat.

Yet another advantage of the invention is that in one embodiment, cooked egg whites can be easily prepared for multiple consumers at the same time.

Yet another advantage of the invention is that it is small and compact, and easily allows a small amount of egg whites to be prepared, while maintaining an optimal thickness of the cooked egg whites.

DETAILED DESCRIPTION

Figure 1A:
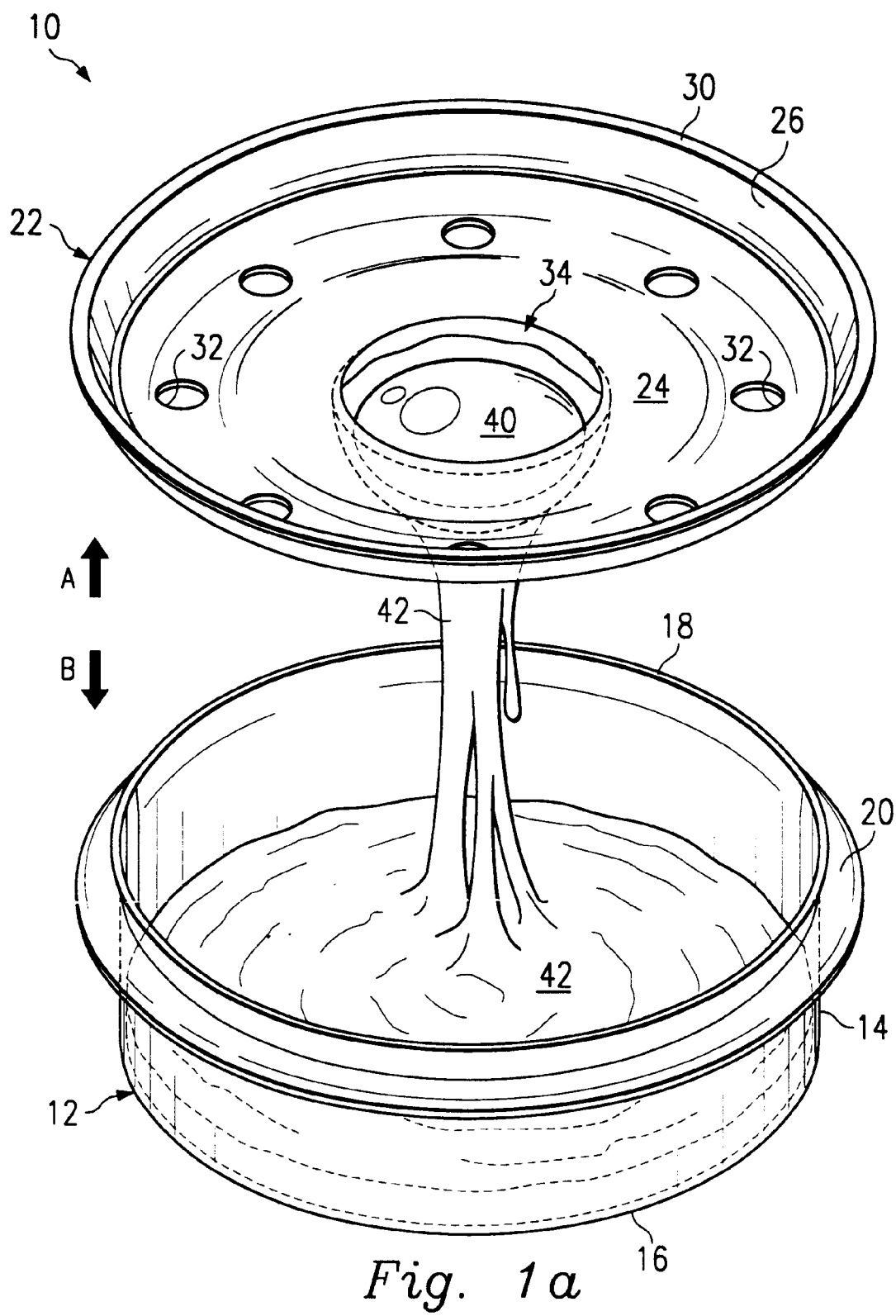
FIG. 1a illustrates an isometric view of an apparatus for separating and cooking eggs.
Figure 1B:
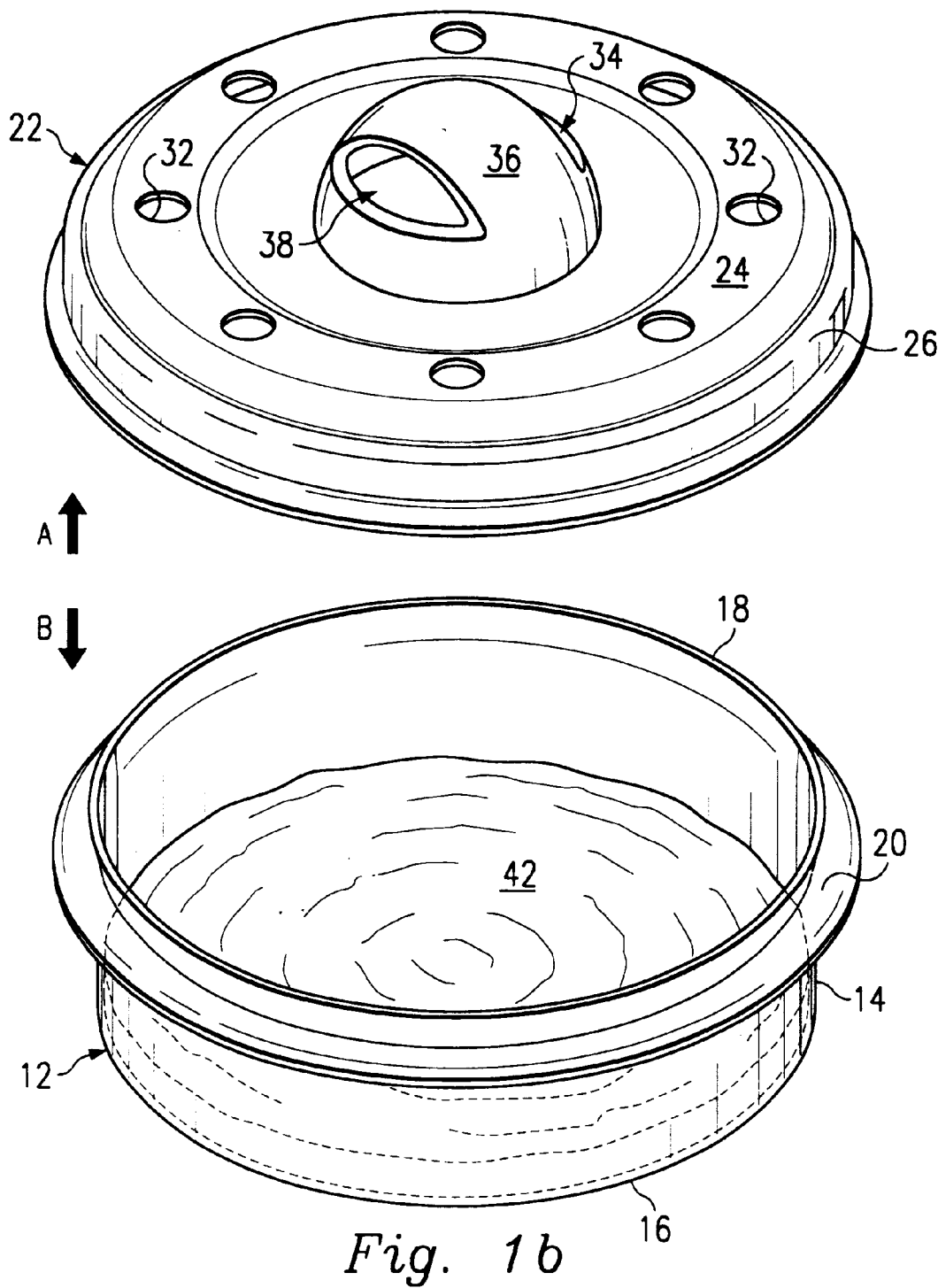
FIG. 1b depicts an isometric view of the embodiment of FIG. 1a with the lid in position for attachment to the bowl.
Figure 1C:
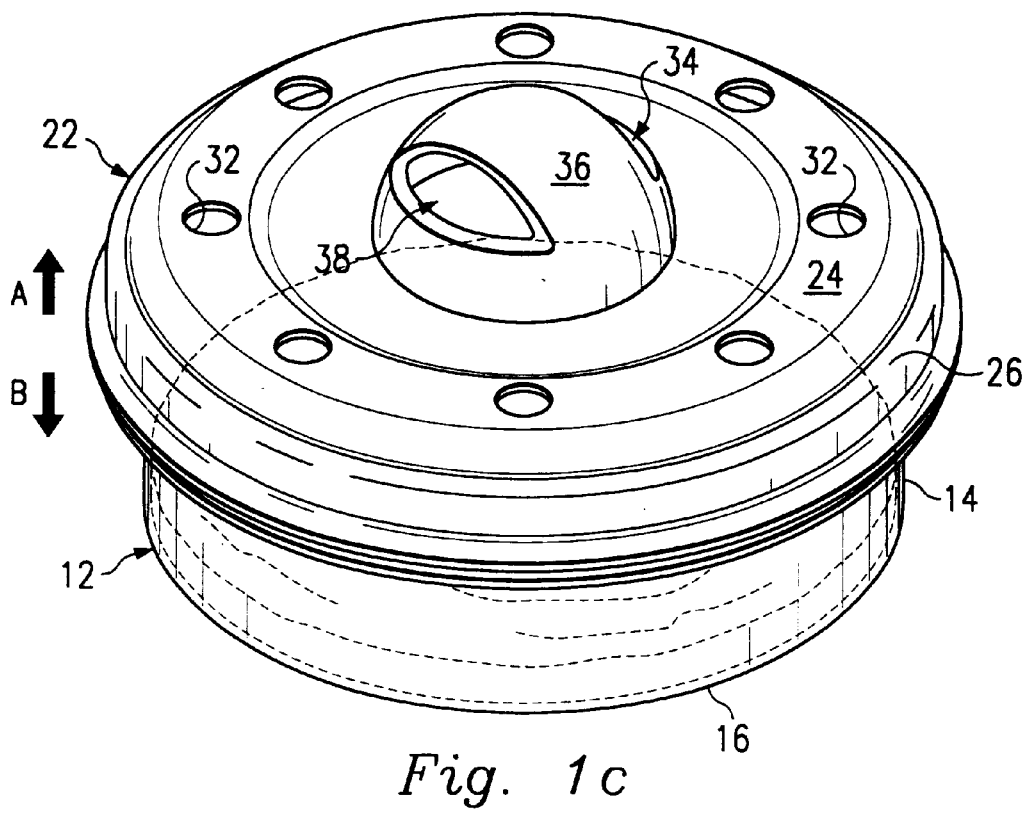
FIG. 1c illustrates an isometric view of the embodiment of FIG. 1a with the lid attached to the bowl.

FIGS. 1a–1c depict an embodiment of an egg separator cooker, generally referred to by the reference numeral 10. The separator cooker 10 is formed from a heat resistant material, such as microwaveable plastic. The separator cooker includes a bowl 12, defined by a cylindrical wall 14 extending perpendicularly from a bottom 16. A brim 18 is formed at the distal end of the wall, and a radially extending lip 20 is formed on the exterior of the wall 14 below the brim.

A flexible lid 22 is provided for removably engaging the bowl 12. The lid has a top 24 for reasons to be described. An edge 26 extends generally perpendicularly from the top in a first direction, the edge terminating in a rim 30. A plurality of vents 32 are disposed in the top 24. A separator, generally referred to by the reference numeral 34, is formed in the center of the top 24. As best seen in FIG. 1b, the separator 34 comprises a half round extrusion 36 extending in a direction opposite the first direction, and having two slots 38 for reasons described below.

In operation, the lid 22 is placed upside down over the bowl 12 (FIG. 1a), and an egg (not shown) is cracked by the consumer against the bowl, so that the egg's contents are deposited into the underside of the lid. As shown in FIG. 1a, the egg yolk, represented by reference numeral 40, is deposited into, or guided to, the separator 34. The slots 38 are of a sufficient size to allow the egg white, represented by reference numeral 42, to pass through the slots, but small enough to retain the yolk 40. After the egg white 42 has been separated into the bowl 12, the yolk 40 is discarded, and the steps repeated with additional eggs. Alternatively, at least one yolk could be retained for flavor, and other ingredients such as chopped ham and onions, or salsa, could be added to create a low fat omelet.

Next, the lid 22 is flipped right side up by the consumer as shown in FIG. 1b. The lid 22 is then placed over the bowl 12 and lowered into position. To close the lid, as shown in FIG. 1c, the edge 26 is placed over the brim 18 of the bowl and a force is exerted in a direction represented by arrow B to create a snug fit. The separator cooker is then placed in a microwave oven (not shown), or some other heat generating device, and the egg whites are cooked. During the cooking process, the vents 32 allow steam to escape and prevent a buildup of pressure and a consequent explosion. After the egg whites are cooked, the lid 22 is removed by exerting force in a direction represented by arrow A on its rim 30, while simultaneously exerting force in a direction represented by arrow B on the lip 20 of the bowl 12.

One advantage of the embodiments described herein is that the egg whites are separated before they are cooked, making separation easier. The lid acts to trap heat and also retain the separator. Thus, the separator cooker is a two-piece unit, counting the bowl, which is convenient for consumers and easier to manufacture. Another advantage is that the egg whites are cooked without fat, unless desired.

Figure 2:
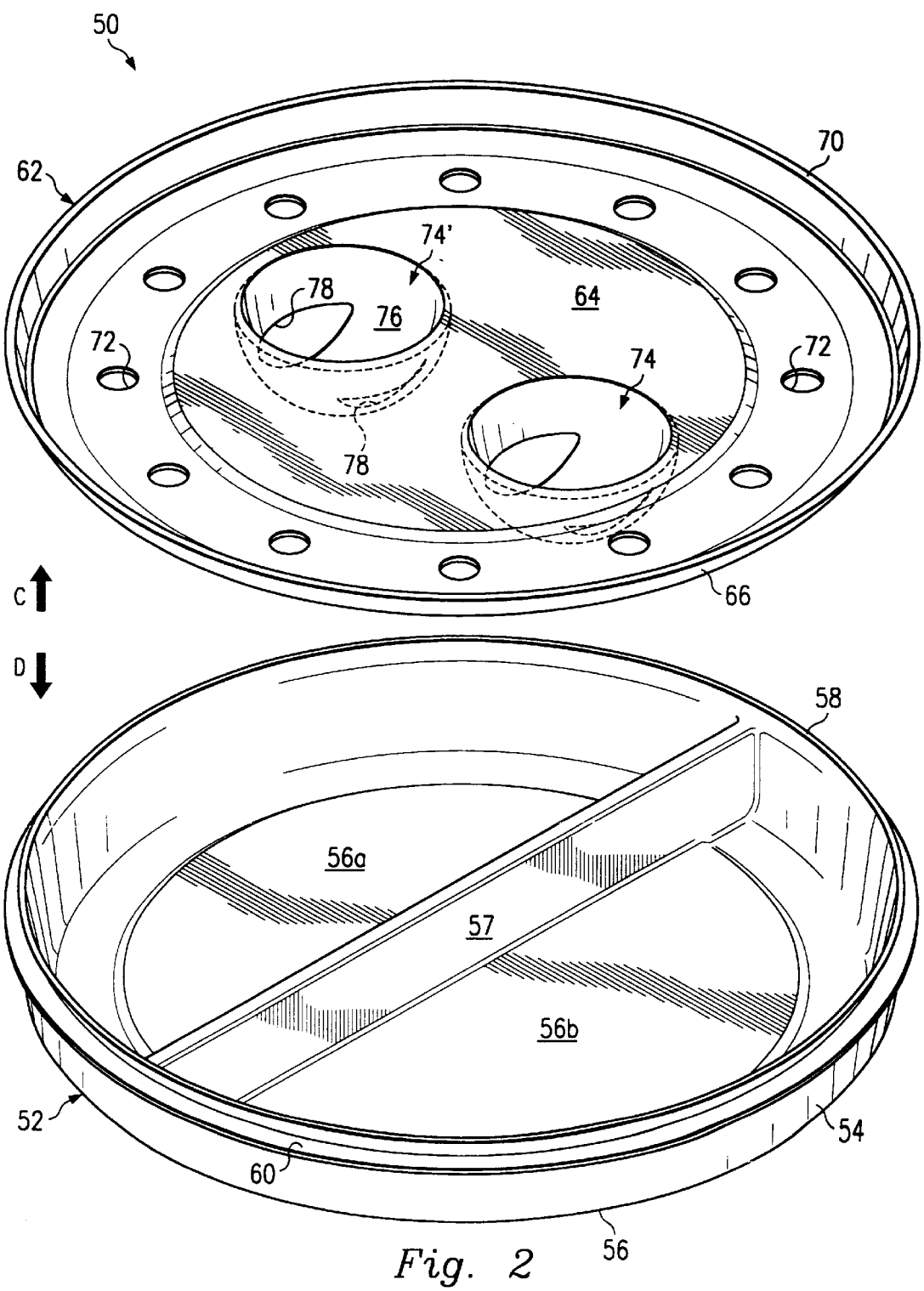
FIG. 2 depicts an isometric view of an alternative embodiment for an apparatus for separating and cooking egg whites.

FIG. 2 depicts another embodiment of an egg separator cooker, generally referred to by the reference numeral 50. The separator cooker 50 is larger than the previous embodiment, and is also formed from a heat resistant material, such as microwaveable plastic. The separator cooker 50 includes a bowl 52, defined by a cylindrical wall 54 extending perpendicularly from a bottom 56. The bottom 56 is divided into two equally sized portions, 56a and 56b, by a wall 57. A brim 58 is formed at the distal end of the wall 54, and a radially extending lip 60 is formed on the wall exterior below the brim.

A flexible lid 62 is provided for removably engaging the bowl 52. The lid 62 has a top 64, with an edge 66 extending perpendicularly in a first direction from the top 64. The edge 66 terminates in a rim 70. A plurality of vents 72 are disposed in the top 64 for reasons to be described. A pair of separators, 74 and 74', are formed in the top 64 extending in a direction opposite the aforesaid first direction. The separators 74 and 74' are identical, and thus only separator 74 is examined in detail. The separator 74 comprises a half round extrusion 76 having two slots 78.

In operation, a consumer places the lid 62 upside down over the bowl 52, and an egg (not shown) is cracked into the underside of the lid. This embodiment can accommodate two yolks at once, as there are two separators 74 and 74', and is suitable for use by two consumers at the same time. The slots 78 are of a sufficient size to allow the egg white to pass through, but small enough to retain the yolk.

After the desired number of egg whites (not shown) have been separated into the bowl, each separator having a corresponding portion of the divided bowl, the lid 62 is flipped right side up and lowered into position. To close the lid, the edge 66 is placed over the brim 58 of the bowl and downward force is exerted in a direction represented by arrow D to create a snug fit. The separator cooker is then placed in a microwave oven (not shown) to cook the egg whites, which may have been previously seasoned to taste as described above. After the egg whites are cooked, the lid 62 is removed by exerting force in a direction represented by arrow C on its rim 70, while simultaneously exerting force in a direction represented by arrow D on the lip 60 of the bowl 52.

One advantage of this embodiment is that egg whites can be cooked for two consumers at once. The wall 57 prevents mixing of the egg white in portions 56a and 56b, and thus allows the egg whites in the portions to be seasoned differently.

Figure 3:
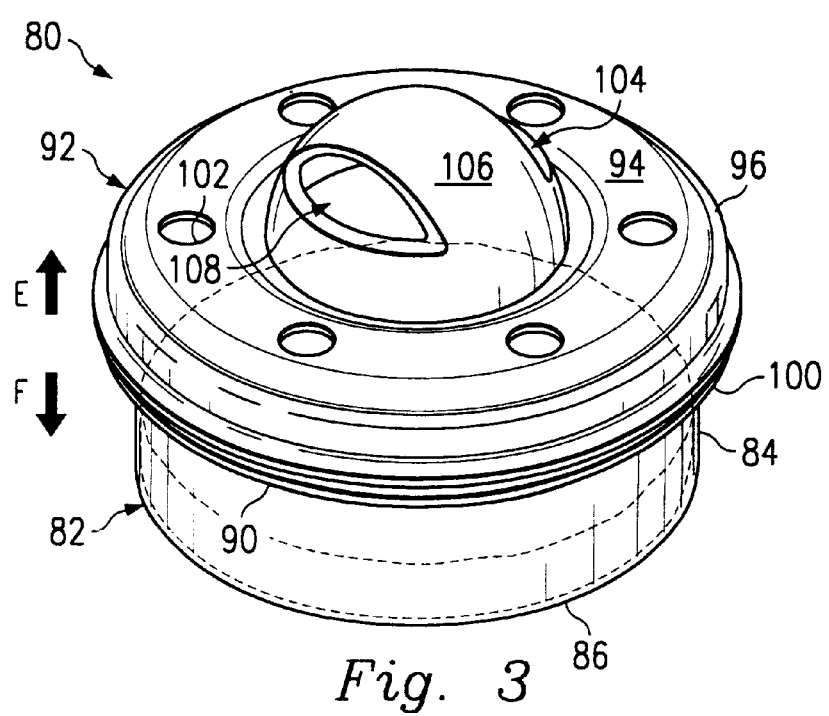
FIG. 3 illustrates an isometric view of yet another alternative embodiment for an apparatus for separating and cooking egg whites.

FIG. 3 depicts yet another embodiment of an egg separator cooker, generally referred to by the reference numeral 80. The separator cooker 80 is also formed from microwaveable plastic. The separator cooker includes a bowl 82, defined by a cylindrical wall 84 extending perpendicularly from a bottom 86. A radially extending lip 90 is formed on the wall exterior.

A flexible lid 92 is provided for removably engaging the bowl 82. The lid 92 has a top 94 for reasons to be described. An edge 96 extends perpendicularly from the top 94 in a first direction, the edge terminating in a rim 100. A plurality of vents 102 are disposed in the top 94. A separator, generally referred to by the reference numeral 104, is formed in the top 94. The separator 104 comprises a half round extrusion 106 extending in a direction opposite the first direction and two slots 108.

In operation, a consumer places the lid 92 upside down over the bowl 82, and an egg (not shown) is cracked into the underside of the lid. The slots 108 are of a sufficient size to allow the egg white to pass through, but small enough to retain the yolk. After the egg white has been separated into the bowl 82, the yolk is discarded, and the lid 92 is flipped right side up and lowered into position. To close the lid, the edge 96 is placed over a distal end of the wall 84 of the bowl and force is exerted in a direction indicated by arrow F to create a snug fit. The separator cooker is then placed in a microwave oven (not shown) to cook the egg whites, which may have been previously seasoned to taste. After the egg whites are cooked, the lid 92 is removed by exerting force in a direction represented by arrow E on its rim 100, while simultaneously exerting force in a direction represented by arrow F on the lip 90 of the bowl 82.

One advantage of this embodiment is that it is small and compact, and allows a relatively small amount of egg whites to be prepared while maintaining an optimal thickness of the cooked egg whites because of the smaller diameter of the bowl. The cooked egg whites then could be paired with an English muffin, for example, forming a low fat snack.

This disclosure shows and describes illustrative embodiments, however, the disclosure contemplates a wide range of modifications, changes, and substitutions. For example, the wall forms a cylinder as depicted, but other shapes may be used; the bottom may be flat, as depicted, or ridged; and the separator slots are depicted as crescent shaped, but may also be square, round, or another shape consistent with their purpose. Such variations may employ only some features of the embodiments without departing from the scope of the underlying invention. For example, the separator slots may vent sufficiently to obviate the need for the vents in some embodiments, or the vents themselves may be modified into any number of shapes. Accordingly, any appropriate construction of the appended claims will reflect the broad scope of the underlying invention.

What is claimed is:

1. An egg white separating and cooking container adapted to be placed in a microwave oven comprising:

a heat resistant bowl having a bottom portion and a wall portion, a flexible lid for removably engaging an external area of the wall portion of the bowl in a snug fit, a radially extending lip disposed on the wall portion and spaced apart from the lid to provide a gripping surface while removing the lid, and means for separating liquid egg whites from eggs, said means being connected to the lid, whereupon the egg whites are cooked in the bowl by subjecting the bowl to microwaves produced by a microwave oven.

2. The device of claim 1 further comprising at least one venting slot in the lid.

3. The device of claim 1 wherein the separating means comprises an extrusion projecting from the lid for retaining the yolk of the egg, the extrusion having at least one slot for allowing the egg white to pass through the slot and into the bowl.

4. The device of claim 1 wherein the bottom portion of the bowl is divided into a first portion and a second portion by a wall.

5. The device of claim 4 wherein the separating means comprises two extrusions projecting from the lid for retaining two egg yolks, each extrusion having at least one slot for allowing the egg white to pass through the slot and into a corresponding portion of the bowl.

6. An egg white separating and cooking container adapted to be placed in a microwave oven comprising:
  a heat resistant bowl having a bottom portion, a cylindrical wall portion, and a radially extending lip disposed on the wall portion, and
  a flexible lid for removably engaging the bowl, the lid comprising:
    (i) an edge for engaging an external area of the wall portion in a snug fit,
    (ii) an extrusion extending from the lid for receiving a raw egg,
    (iii) at least one slot in the extrusion for retaining the yolk while allowing egg whites to pass through the slot into the bowl, and
    (iv) at least one vent for allowing steam to escape while the egg whites are being cooked by a microwave oven,
  wherein in a first position of the lid, the lid is placed on the bowl to separate a raw egg, and in a second position of the lid, the lid is turned over and pushed down to engage the wall portion of the bowl in a snug fit, the radially extending lip being spaced apart from the lid to provide a gripping surface for a user removing the lid.

7. The device of claim 6 wherein the bottom portion of the bowl is divided into a first portion and a second portion by a wall.

8. The device of claim 7 wherein there are two extrusions projecting from the lid for retaining two egg yolks, each extrusion having at least one slot for retaining the yolk while allowing egg whites to pass through the slot into a corresponding portion of the bowl.

9. A method for separating and cooking egg whites in a microwave oven comprising the steps of:
  providing a bowl;
  providing a lid having a slotted extrusion;
  placing the lid on the bowl and breaking a raw egg into the slotted extrusion, the extrusion retaining the yolk while allowing the egg whites to pass through the slot into the bowl;
  turning the lid over and pushing down on the lid to engage the bowl in a snug fit; and
  cooking the egg whites in the bowl.

\* \* \* \* \*